United States Patent [19]
Campbell

[11] 3,732,165
[45] May 8, 1973

[54] SALT PLATFORM SEAL ARRANGEMENT

[75] Inventor: Donald S. Campbell, North St. Paul, Minn.

[73] Assignee: Ecodyne Corporation, Chicago, Ill.

[22] Filed: Mar. 24, 1971

[21] Appl. No.: 127,479

[52] U.S. Cl. .................................................210/190
[51] Int. Cl. ...............................................C01d 3/04
[58] Field of Search.............................210/190, 191

[56] References Cited

UNITED STATES PATENTS

| | | | |
|---|---|---|---|
| 3,073,674 | 1/1963 | Rudelick | 210/191 X |
| 2,988,107 | 6/1961 | Rudelick | 137/625.46 |
| 3,662,918 | 5/1972 | Crawford et al. | 210/532 X |
| 3,502,442 | 3/1970 | Campbell et al. | 210/191 X |

*Primary Examiner*—Frank A. Spear, Jr.
*Attorney*—Charles M. Kaplan and Joel E. Siegel

[57] ABSTRACT

An improved salt platform support and seal arrangement mounted inside the brine well of a water conditioner, comprising: a substantially rectangular brine drum having a pair of apposing side walls, the side walls having substantially horizontal rib portions undercut therefrom extending a short distance into the drum; and a salt platform supported on the rib portions so as to overlap the rib portions a sufficient distance to permit sliding movement of the salt platform on the rib portions while preventing salt pellets from falling to the bottom of the brine drum.

2 Claims, 3 Drawing Figures

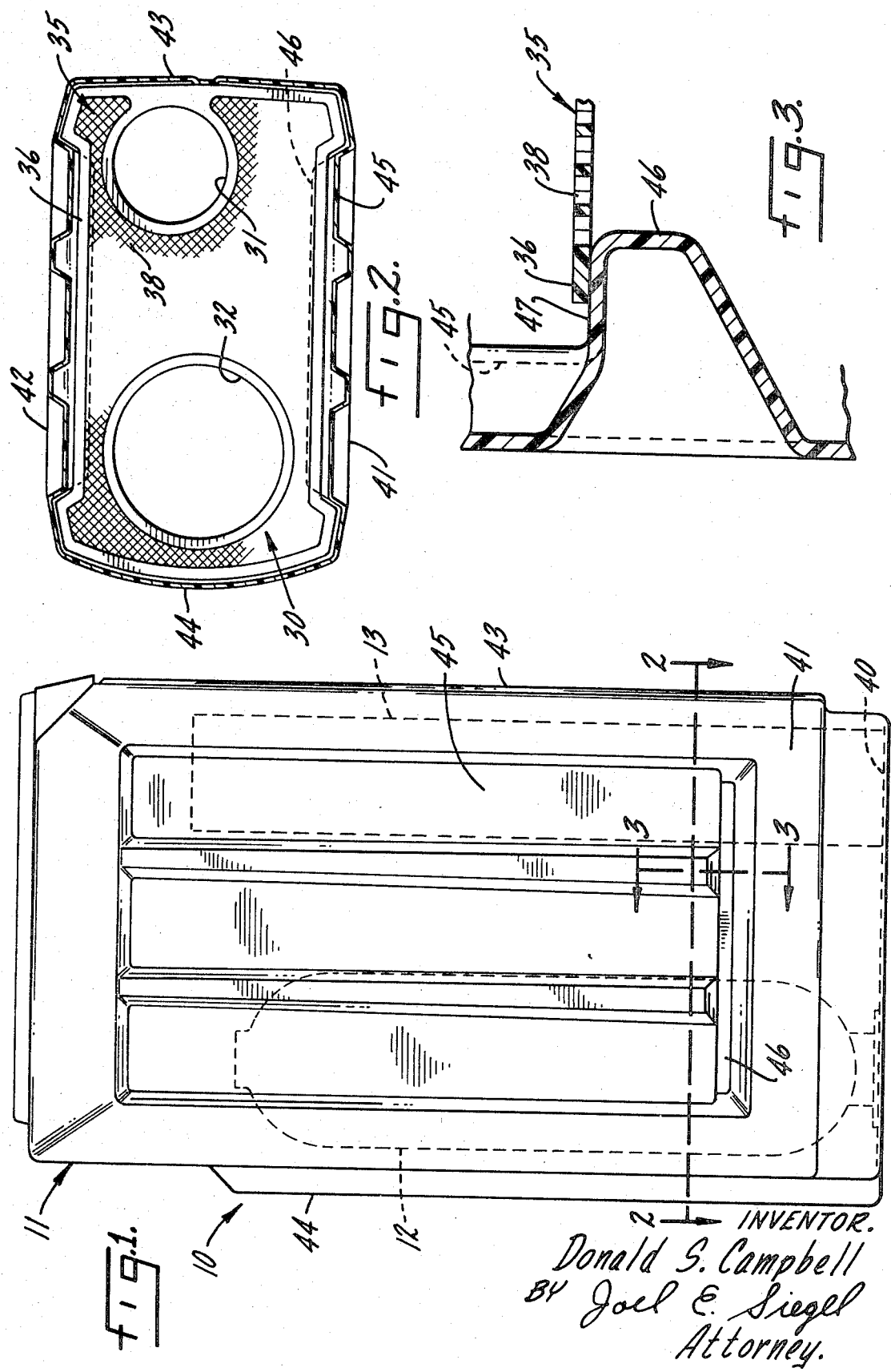

SALT PLATFORM SEAL ARRANGEMENT

BACKGROUND OF THE INVENTION

This invention relates in general to a water conditioning system and more particularly to a combination support and seal means for the salt platform located within the brine drum.

Water softening with ion exchange material such as resin particles or the like is well-known in the art. During the softening process, or service cycle, the ion exchange resin particles acquire hardness inducing ions from the water in exchange for soft ions, or ions which do not induce hardness. After prolonged contact of the resin particles with raw water, their ion exchange capacity is diminished considerably and regeneration of the resin particles must be accomplished, conventionally by contacting the resin particles with a brine solution, i.e., an aqueous solution of sodium chloride or potassium chloride or the like.

The ion exchange process and the regeneration of the ion exchange material are accomplished in a softener or resin tank of well known construction while a separate brine drum is conventionally employed to manufacture and store brine between regeneration cycles. When regeneration is initiated in the system by a suitable timing means, brine is drawn from the brine drum and passed through the bed of ion exchange material in the softener tank to reverse the exchange of ions and revitalize the bed by removing hardness inducing ions and replacing them with sodium ions, for example, from the brine solution. After the brine cycle, the brine drum is refilled to a predetermined level with fresh water. The fresh water rises to cover a salt platform disposed within the brine drum. The salt platform carries a predetermined amount of pelletized sodium chloride, for example, in a layer on its upper surface. Sufficient salt goes into the solution to form a saturated brine solution in the brine drum at ambient temperature. An example of such a system is disclosed in U.S. Pat. No. 3,442,624, assigned to the assignee of the present invention.

The salt platform is conventionally fabricated of metal or plastic and is perforated to facilitate the passage of water and brine solution through it while the salt pellets are retained on its upper surface. It has been the practice to provide a separate gasket around the rim of the salt platform to prevent salt granules from falling to the bottom of the brine well.

In brine draw systems generally of the aforedescribed character, a consistent problem has developed in providing a suitable seal around the periphery of the salt platform. This problem is largely due to the fact that the brine tank is constructed of a semi-rigid material and thus the liquid within the brine tank tends to expand the brine drum sides outwardly which prevents a conventional gasket seal from performing adequately. When the salt platform does not seal well, salt pellets or smaller particles drop into the bottom of the drum and, because the brine solution is 100 percent saturated, the particles do not dissolve. When enough particles have fallen through the quantity of brine is reduced and also interference may occur with the brine daw mechanism.

Various types of salt platform seals have been tried, but each seems only to have its own problems. Prior attempts to solve these problems have resulted in seals which have reduced the exposed aperture area, resulted in increased salt bridging problems, and increased the material and assembly costs.

SUMMARY OF THE INVENTION

It is a primary object of the present invention to provide a salt platform support arrangement which prevents salt pellets from falling into the bottom of the brine well.

Another object is to provide a salt platform support arrangement that increases the rigidity of the brine drum sidewalls and thus reduces the outward expansion thereof due to the liquid contained therein.

A further object is to provide a salt platform support arrangement that in addition to the above objects is inexpensive to manufacture and assemble while being reliable in operation.

The salt platform support arrangement of the present invention reduces the problem of salt pellets falling to the bottom of the brine well by providing a unique support shelf that performs the dual function of increasing the rigidity of the brine drum sidewalls and providing a combination support and sealing means that permits limited movement of the sidewalls without effecting the seal between the salt platform and the sidewalls. The support arrangement comprises a pair of apposing substantially horizontal rib portions undercut from the sidewalls of the brine drum. The rib portions have substantially horizontal surfaces which extend a short distance into the drum. The salt platform is supported on the horizontal surfaces such that the salt platform overlaps the rib portions a sufficient distance to permit limited sliding movement of the salt platform on the horizontal surfaces. A plurality of vertically extending grooved indentations are molded into the side walls to increase the rigidity thereof.

The invention, together with its construction and method of operation, along with other objects and advantages thereof, is illustrated more or less diagramatically in the drawing, in which:

DESCRIPTION OF THE DRAWINGS

FIG. 1 is a side elevational view of a water conditioning system incorporating a brine drum embodying features of the present invention, with parts removed for clarity;

FIG. 2 is a sectional view taken along line 2—2 of FIG. 1; and

FIG. 3 is an enlarged sectional view taken along line 3—3 of FIG. 1.

DESCRIPTION OF A PREFERRED EMBODIMENT

Referring now to the drawing, and particularly to FIGS. 1 and 2 a water conditioning system incorporating a salt platform support arrangement embodying features of the present invention is illustrated generally at 10. The system 10 includes a rectangular brine drum 11 having a treatment tank 12 and a brine well 13 mounted therein. Mounted on the cover of the drum 11 is a system controller (not shown). Also mounted within the brine drum 11, about three-quarters of the way down, is a horizontally disposed salt platform 30. Salt platform 30 is unitarily formed and is adapted to support a layer of pelletized or granular sodium chloride or the like while maintaining a particle-tight seal around its periphery with the adjacent inner surface of the brine drum 11, and the outer surfaces of the treatment tank 12 and the brine well 13.

Salt platform 30 is generally rectangular in plan configuration, although it might be any shape dependent upon the shape of brine drum 11. It does, however, have peripheral cut-outs 31 and 32 corresponding to the external cross-sectional configurations of the brine well 13 and treatment tank 12, with which the periphery of the salt platform mates. The platform 30 comprises a centrally disposed foraminous grill-work 35 having a solid border 36 surrounding it. Grill-work 35 and border 36 are of identical thickness and fabricated of plastic, preferably polypropylene. Fabrication is preferably by injection molding. The apertures 38 in the grill-work 35 are formed during the molding process. Cut-outs 31 and 32 are dimensioned to snugly fit against the sidewalls of brine well 13 and treatment tank 12 respectively.

Brine drum 11, generally rectangular in plan configuration, includes a bottom 40, a pair of opposing side walls 41 and 43, a front wall 43, and a real wall 44. As best seen in FIG. 2, side walls 41 and 42 each have three indented vertical reinforcing grooves 45 formed therein. Side walls 41 and 42 further each have a horizontally extended rib 46 undercut therefrom and spaced approximately one quarter of the distance from the bottom to the top of the side wall. Ribs 46 include horizontal support surfaces 47 which extend inwardly a pre-determined distance towards the ceter of drum 11. Grooves 45 extend from a point spaced a short distance from the top of walls 41 and 42 to immediately above surfaces 47. Side walls 41 and 42, front wall 43, rear wall 44, and bottom 40 are rotationally molded in a one step process of a high density polypropylene material. Grooves 45 and ribs 46 permit brine drum 11 to withstand substantial pressure with minimum expansion of the side walls 41 and 42.

As best seen in FIG. 3, ribs 46 serve a dual purpose in that salt platform 30 is supported on horizontal surface 47. The border portion 36 overlaps the inner edges of surfaces 47 to permit limited sliding movement of surfaces 47 relative to border portion 36 without effecting the supporting function of ribs 46. It can readily be seen that even with limited outward expansion of side walls 41 and 42 salt pellets are prevented from falling into the bottom of brine drum 11. Although illustrated with support ribs 46 formed only in sidewalls 41 and 42 it should be appreciated that similar support ribs may be formed in front wall 43 and rear wall 44.

The present invention provides a unique brine drum construction that increases the rigidity of the drum and thus permits same to be molded of a thinner material. The brine drum further includes structural rib portions undercut from the sides thereof to support a salt platform and prevent salt particles from falling into the bottom of the brine drum. It should also be appreciated that the salt platform support arrangement does not require additional support members and is capable of rapid assembly.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. In a brine draw system for a water conditioner, including a brine drum made from a semi-rigid material which tends to bulge outward upon the application of internal forces, the improvement in a salt platform support and seal arrangement integral with the side walls of the brine drum positioned so as to define a brine well therebelow; comprising:

a. a substantially rectangular brine drum having a pair of opposing side walls, said side walls including substantially horizontal rib portions undercut therefrom having substantially horizontal surfaces extending a predetermined distance into said drum;

b. a substantially horizontal foraminous salt platform supported on said horizontal surfaces so as to define an unobstructed brine well therebelow;

c. said salt platform overlapping said rib portions a sufficient distance to permit sliding movement of said salt platform on said horizontal surfaces as said side walls bulge outward due to internal forces and thereby prevent salt pellets from entering said brine well; and d. said opposing side walls further include a plurality of indented vertical reinforcing grooves integral therewith positioned immediately above and in cooperation with said horizontal ribs so as to control the outward bulging of said side walls.

2. The invention as defined in claim 1 wherein said brine drum is rotationally molded in a one step process from high density polypropylene.

* * * * *